(12) United States Patent
Budd et al.

(10) Patent No.: US 6,803,972 B1
(45) Date of Patent: Oct. 12, 2004

(54) POLARIZATION CONVERSION SYSTEM

(75) Inventors: Russell Alan Budd, North Salem, NY (US); Derek Brian Dove, Mount Kisco, NY (US); Rama Nand Singh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/975,337

(22) Filed: Nov. 20, 1997

(51) Int. Cl.$^7$ ............... G06F 1/1335; G06F 1/1333; C09K 19/02
(52) U.S. Cl. ............... 349/9; 349/58; 349/115; 349/176
(58) Field of Search ............... 349/9, 176, FOR 139, 349/115, 58

(56) References Cited

U.S. PATENT DOCUMENTS

| | | | | |
|---|---|---|---|---|
| 5,283,600 A | * | 2/1994 | Imai | 349/9 |
| 5,295,009 A | * | 3/1994 | Barnik et al. | 349/115 |
| 5,313,318 A | * | 5/1994 | Gruenberg et al. | 349/58 |
| 5,412,492 A | * | 5/1995 | Zammit et al. | 349/58 |
| 5,729,306 A | * | 3/1998 | Miyake et al. | 349/9 |
| 5,772,299 A | * | 6/1998 | Koo et al | 349/9 |

* cited by examiner

Primary Examiner—William L. Sikes
Assistant Examiner—Tarifur R. Chowdhury
(74) Attorney, Agent, or Firm—Scully, Scott, Murphy & Presser; Marian Underweiser, Esq.

(57) ABSTRACT

A class of novel structures which make novel use of polymer based reflective polarizing films in an improved polarization conversion system which are useful in liquid crystal projection systems that are easily manufactured, of lower cost, and permit the versatility of higher numerical aperture polarization conversions. Another aspect of the present invention are polarization modulating liquid crystal projection display systems utilizing the polarization conversion systems of the present invention.

27 Claims, 6 Drawing Sheets

POLARIZATION CONVERSION SYSTEM

BACKGROUND OF THE INVENTION

1. Field of the Invention

This invention relates generally to projection type liquid crystal systems such as projection computer displays, projection monitors, projection video or television systems, and more particularly to a low cost polarization conversion system and the optical arrangement for a projection type liquid crystal system based on polarization modulating liquid crystal displays.

2. Description of the Related Art

Polarization conversion systems for use in projection type liquid crystal displays (LCDs) are well known in the prior art. In a projector, light from a source such as a metal halide arc lamp is collected by a reflector and relayed onto an object (e.g., a LCD light valve), with the help of condenser and relay lenses. The illuminated object is then projected onto a display screen at a desired magnification. However, since a dominant type of liquid crystal displays form the image by discriminating between the polarization of light from bright and dark pixels, the light collected from the light source must be polarized by means such as a linear polarizer before being incident on the liquid crystal light valve. In the light valve, the bright and dark pixels are discriminated by the polarization of the light leaving them. This light is then analyzed by means of an analyzer. Typically, the act of polarization of unpolarized light by the conventional polarizers implies that the light of unwanted polarization be lost due to absorption in the polarizers. The alternative of using polarizing cube or plate beam splitters results in transmitting one polarization and reflecting the other. In such a situation, the unused light of unwanted polarization must be recaptured and its polarization altered to be that of the used polarization before it can be used to illuminate the light valve. These polarization conversion systems generally comprise a light reflector, a quarter wave plate and/or a half wave plate. A quarter wave plate shifts the polarization of incident light by 45 degrees. Similarly, a half wave plate shifts the polarization of incident light by 90 degrees.

In U.S. Pat. No. 5,200,843 to Karasawa et al., the polarization and polarization conversion takes place over the full aperture of the light source and therefore the outgoing light must go through a intensity homogenizer before it is incident upon the light valve. While illumination systems of this type have their benefits, they tend to be bulky and expensive.

Still other polarization conversion systems are known in the prior art, such as those disclosed in EP A1 0753780 and EP A1 0753971, shown in FIG. 1A, and referred to generally as reference numeral 100. In these systems the full aperture of the light coming from a light source 101 and a reflector 102 which reflects the light from the light source in the direction indicated by arrows A, is sampled, subdivided, and focused with the help of an array of lenses 103, resulting in an array of beam samples 114. Near the focus of these beam samples is the polarization conversion system 120 which consists of a stack of plate polarizing beam splitters 115, each plate of the stack seeing one row of beam samples 114. Since the polarization conversion system 120 is in the vicinity of the focus of the beam samples, the beam samples are separated from each other and a copy of the beam sample can be placed at its side. For example, the beam sample 114 is separated into components of two polarizations with the P-polarization 117 being transmitted and the S-polarization 116 being reflected from the front side 115a of the polarizing beam splitter 115. The S-polarization is further reflected by the rear side 115b of the plate polarizing beam splitter 115. The reflected beam then goes through a half wave plate 130 where its polarization is shifted 90° to become a P-polarization 118 upon transmission from the plate. Thus the outgoing beam has suffered minimal amplitude loss and has acquired a single type of linear polarization in the form of beams 117 and 118. This polarization conversion occurs for all the beam samples which are then redirected towards the light valve (not shown) by a second array of lenses 113. The appropriately magnified and overlapping beam samples illuminate the light valve with polarized light in a very efficient way. The side of the polarization conversion system 120 of FIG. 1A facing the reflector has the alternating plates of the stack blocked in the form of light blocks 122 to maximize polarization purity. The system has many components and while the assembly is compact and efficient, it is relatively expensive to manufacture such polarization conversion systems 120.

FIG. 1B shows an enlarged schematic view of the polarization conversion system 120 of FIG. 1A. It consists of a stack of plane parallel plate polarizing beam splitters 115 with one side of the plate 115a having a polarizing beam splitting multi-layer dielectric coating and the other side 115b being blocked by the light blocking grid 122 so it does not receive any direct light. As shown, the light is incident on alternate plates only. The grid of half wave plates 130 is similarly applied to alternate plates so the half wave plate 130 only sees the reflected light 116a of S-polarization 116 and converts it to P-polarization 118. While this arrangement has its advantages the assembly and alignment of all the components is expensive. Also, the multi-layer thin film polarizing films only work over a limited range of angles.

For the above reasons, there is a need in the art for a simple, low cost polarization conversion system which is capable of operation at high numerical apertures.

SUMMARY OF THE INVENTION

Therefore, it is an object of the present invention to provide a polarization conversion system which produces linearly polarized light from unpolarized light without losing half the light intensity.

Another object of the present invention is to provide a polarization conversion system which produces linearly polarized light from unpolarized light which enables a brighter image without increasing the wattage of the light source.

Yet another object of the present invention is to provide a polarization conversion system which produces linearly polarized light from unpolarized light for use in projection displays.

Yet another object of the present invention is to provide a polarization conversion system which produces linearly polarized light from unpolarized light which is of simpler construction and thus more economical.

Yet still another object of the present invention is to provide a polarization conversion system which produces linearly polarized light from unpolarized light which performs over a broad range of incident light angles (i.e., numerical apertures).

Yet another object of the present invention is to provide a polarization conversion system which produces linearly polarized light which performs over a broad range of wavelengths covering the three primary colors, red, green and blue.

Accordingly, a polarization conversion system for converting incident light is provided in which the incident light having at least a first and second polarization is converted to light of one of the first and second polarizations. The polarization conversion system comprises an input side at which the incident light enters and an output side at which light of one of the first and second polarizations exits. A polymer based reflective polarizing material disposed between the input and the output sides, in communication with the incident light, and angled with respect to the incident light for transmitting light of one of the first and second polarizations and reflecting the other is provided. A reflector for reflecting the reflected light from the polymer based reflective polarizing material and a light block disposed on the input side for blocking the incident light from communication with the reflective means are also provided. Lastly, a polarization convertor for shifting the polarization of the reflected light to that of the transmitted light is provided. The polymer based reflective polarizing material, the reflector, the polarization convertor, and the light block are arranged such that the transmitted light of one of the first and second polarizations exits the output side, and the reflected light is directed towards the reflector which directs it towards the polarization convertor which in turn shifts the polarization of the reflected light to that of the transmitted light before exiting the output side.

Another aspect of the present invention are polarization modulating liquid crystal projection display systems utilizing the polarization conversion systems of the present invention.

It can be realized that while the invention is described relative to a parabolic reflector that produces a largely collimated beam of light, it may also be readily employed with elliptical or other types of reflectors by incorporation of collimating condenser lens to produce a collimated beam as is known in the art.

BRIEF DESCRIPTION OF THE DRAWINGS

These and other features, aspects, and advantages of the apparatus and methods of the present invention will become better understood with regard to the following description, appended claims, and accompanying drawings wherein:

DETAILED DESCRIPTION OF THE PREFERRED EMBODIMENTS

Figure 1A:
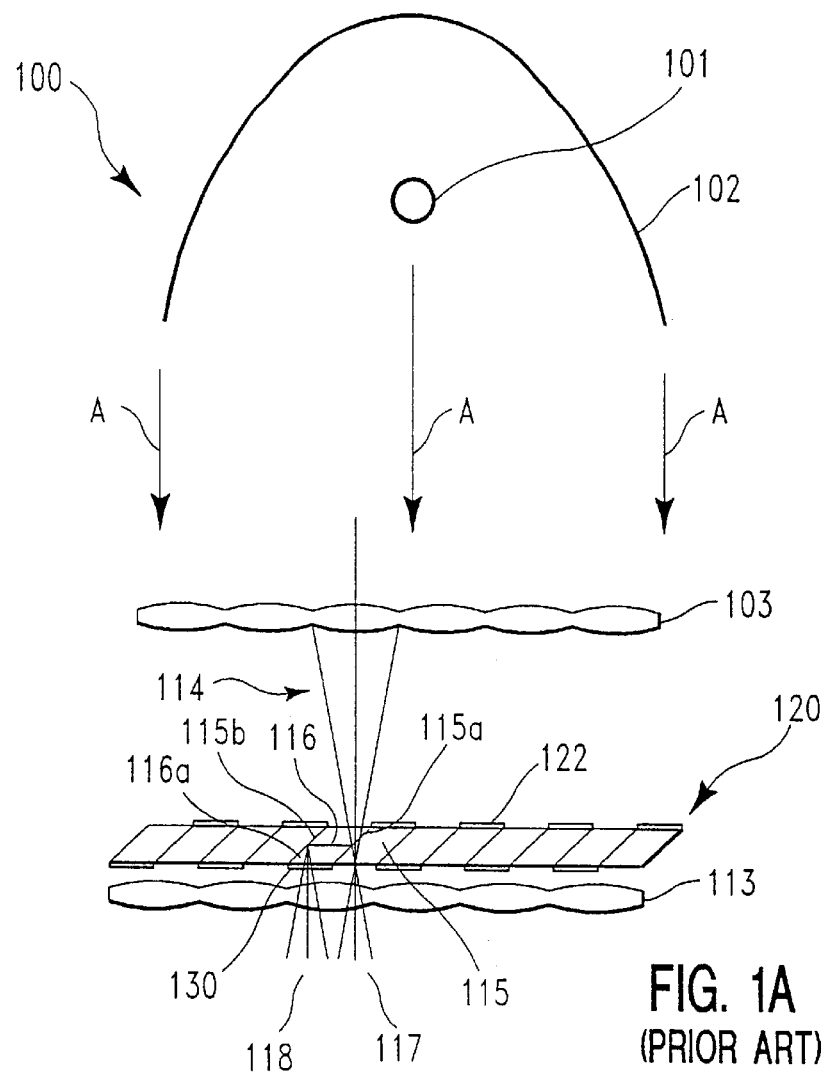
FIG. 1A illustrates a LCD projector illumination system of the prior art.
Figure 1B:
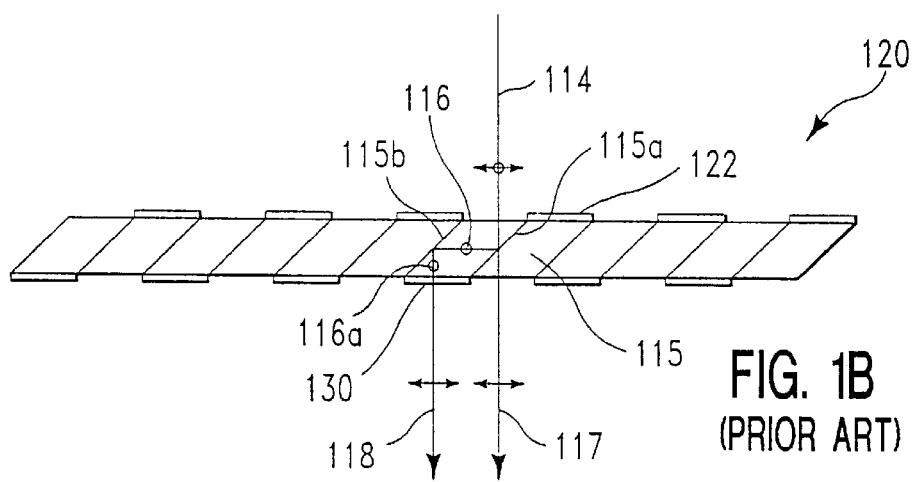
FIG. 1B illustrates an enlarged view of the Polarization Conversion System of FIG. 1A.
Figure 2A:
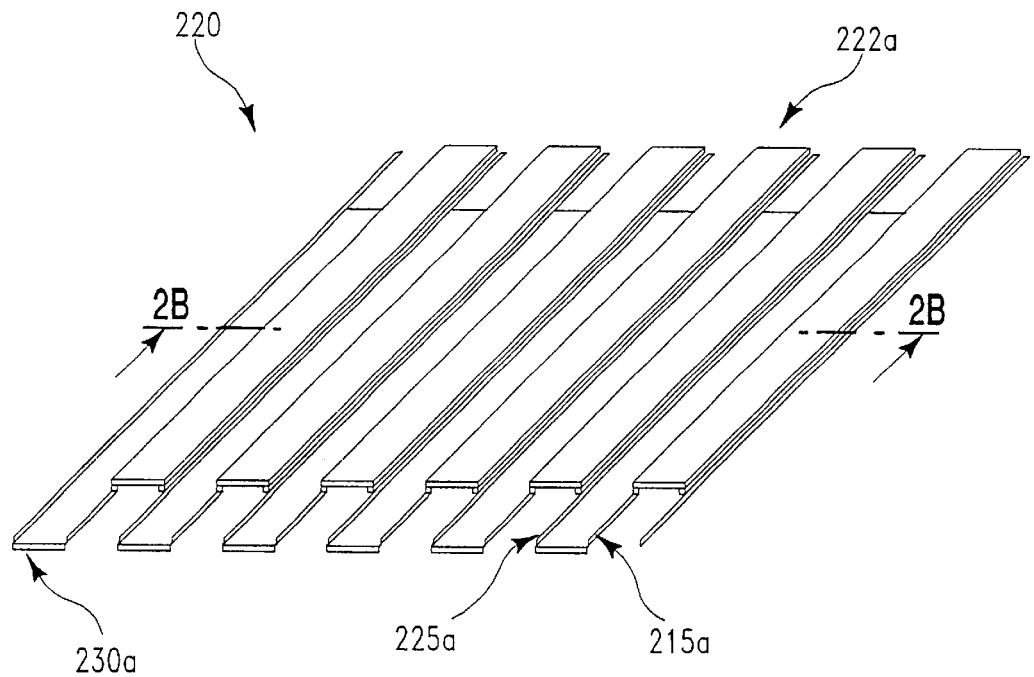
FIG. 2A illustrates an isometric view of a Polarization Conversion System of the present invention.
Figure 2B:
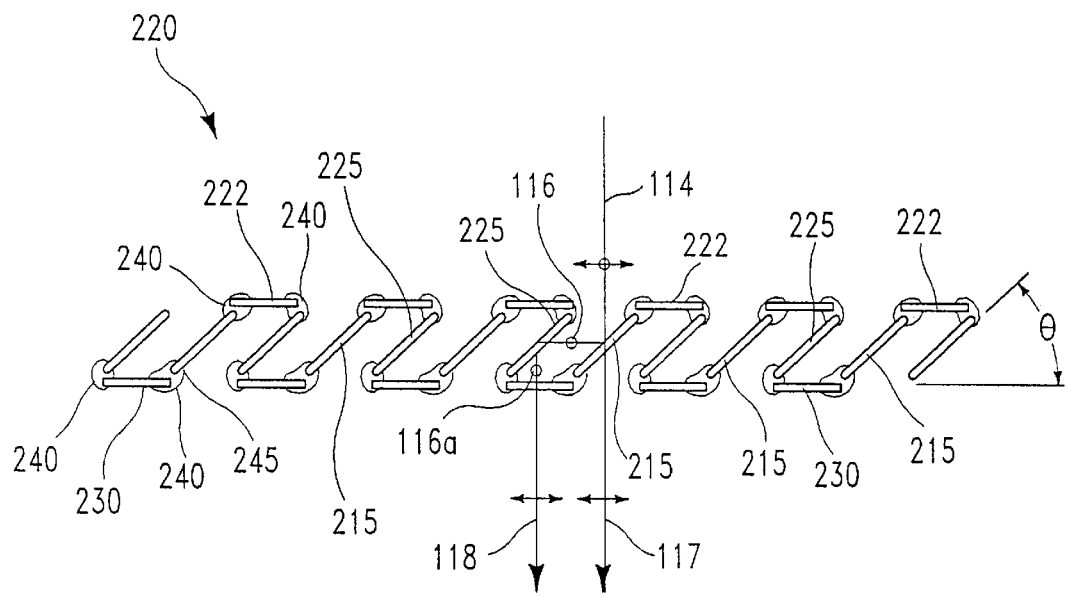
FIG. 2B illustrates a sectional view of the Polarization Conversion System of FIG. 2A taken along line 2B—2B.

Referring now to FIGS. 2A and 2B, there is illustrated a polarization conversion system of the present invention, referred to generally as reference numeral 220, in which the expensive multi-layer thin film polarizing beam splitting coating on the plane parallel plates as used in the prior art are replaced with a polymer based reflective polarizing material 215, such as DBEF available from 3M Corporation. The reflective polarizing material 215 is preferably suspended in air as shown, or alternatively sandwiched between two thin glass plates (not shown), or between glass wedges (not shown). The reflective polarizing material 215 is generally several hundred microns thick, sturdy enough to be suspended on its own, and does not necessarily need supporting substrates as is the case with the multi-layer thin film coatings of the prior art. This leads to a reduction in parts, weight, and manufacturing costs.

The reflective polarizing material 215 is angled at an angle (90-θ) with respect to the incident light 114 such that it transmits the P-polarized light 117 and reflects the S-polarized light 116 towards the S-reflecting mirror 225 (or alternatively reflective polymer material). A reflector, such as a S-reflecting mirror 225 is proximate to the reflective polarizing material and similarly angled with respect to the incident light. The S-reflecting mirror 225 reflects the S-polarized light 116 and is preferably the same reflective polarizing material that splits the S- and P-polarizations. Alternatively, the S-reflector 225 may be a non-polarizing reflector or a regular reflective mirror on a thin glass substrate (not shown).

As is done in the prior art, a light block 222 is provided such that the incident light 114 is prevented from communicating with the S-reflecting mirror 225. Similarly, a polarization convertor, such as a half wave plate 230 is positioned such that the S-polarized light 116a reflected from the S-reflecting mirror 225 is directed towards the half wave plate 230 whereby the S-polarized light 116 is converted to P-polarized light 118. The components as shown in FIG. 2B are preferably suspended in air with the help of holders 240. The holders 240 have slots 245 for acceptance of the components and are preferably fabricated of metal or plastic.

The polarization conversion system 220 is preferably arranged as shown in FIG. 2A where the polymer based reflective polarizing material 215, the S-reflecting mirrors 225, the half wave plates 230, and the light blocks 222 are configured as an array of slats, the slat arrays are referred to generally as reference numerals 215a, 225a, 230a, and 222a, respectively. The slats are preferably arranged in an array of polarization conversion systems which operate as a single unit. However, it is understood by someone skilled in the art that the polymer based reflective polarizing material 215, the S-reflecting mirrors 225, the half wave plates 230, and the light blocks 222 can be configured and shaped in a number of ways without departing from the scope and spirit of the invention. It is also understood by someone skilled in the art that the polarization system 220 does not have to be an array of elements, it can consist of a single reflective polarizing material 215, reflector 225, light block 222, and polarization convertor 230.

Figure 4:
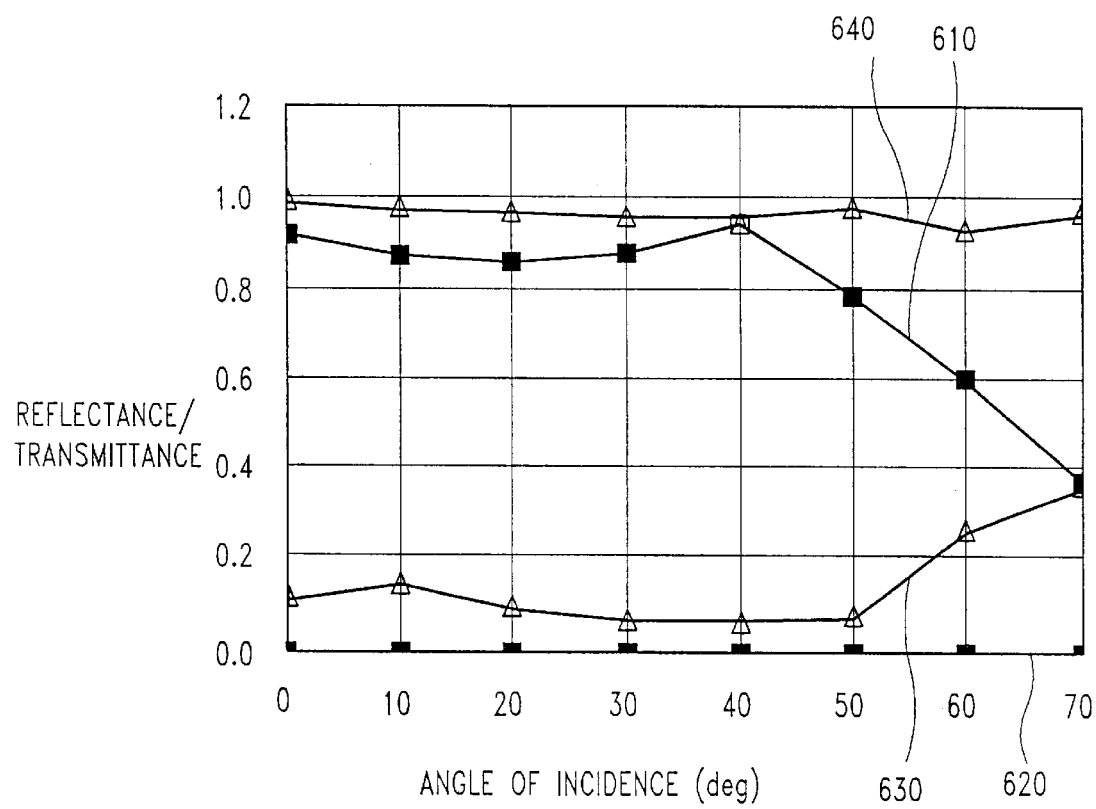
FIG. 4 illustrates a graph of the transmittance and reflectance of the P- and S-polarizations for the Polarization Conversion System of the present invention.
Figure 5:
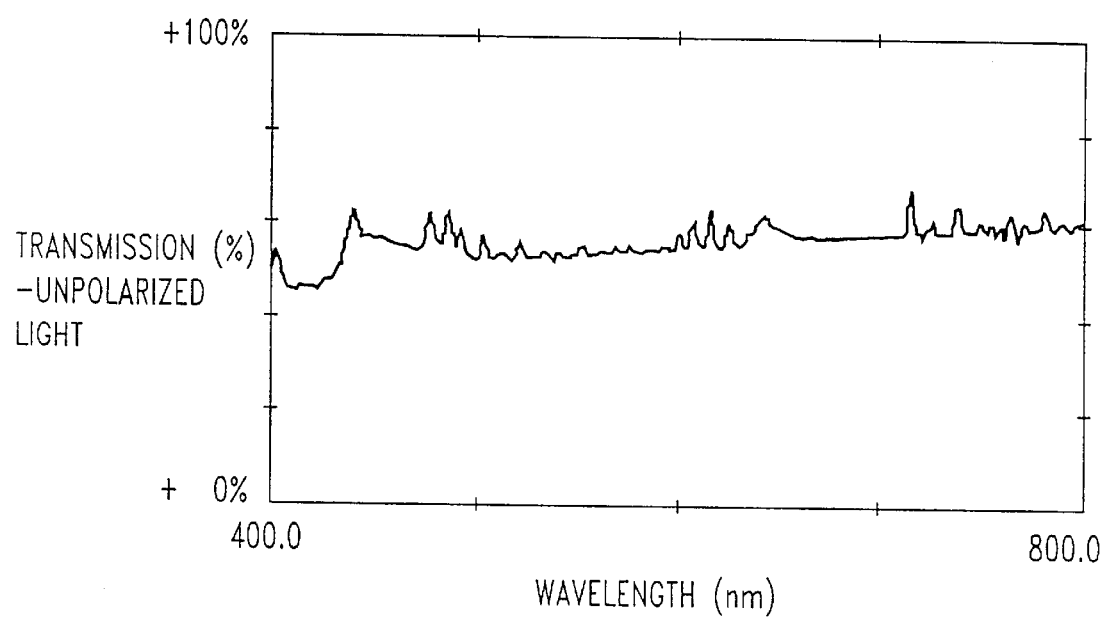
FIG. 5 illustrates a graph of the percent transmission of unpolarized light through Polarization Conversion System of the present invention.

The operation of the polarization conversion system 220 will now be discussed with reference to FIGS. 2B, 4, and 5. For purposes of this discussion, it is assumed that the polarization conversion system 220 is configured as an array of repeating elements, as shown in FIG. 2B, however, as discussed previously, its operation would be the same for a single group of elements. Unpolarized light from a light source and reflector is directed onto the polarization conversion system 220 by an array of lenses. The incident light 114 directed towards the polarization conversion system 220 consists of P-polarized 117 and S-polarized 116 light. Alternating areas of light blocks 222 block the incident light 114 from communicating with the S-reflecting mirrors 225. In portions of the polarization conversion system where the incident light 114 is not blocked by the light blocks 222, the light 114 communicates with the reflective polarizing material 215, which is disposed between light blocks 222 and angled at an angle e such that the reflective polarizing material 215 transmits the P-polarized light 117 and reflects the S-polarized light 116 towards the S-reflecting mirrors 225 (or alternatively reflective polarizing material). The S-polarized light 116 is then reflected 116a towards a half wave plate 230 where it is converted to P-polarized light 118. Thus, the incident light 114 containing both P- and S-polarized light is converted to light containing only P-polarized light 117,118.

Whereas the multi-layer thin film polarizing films of the prior art work over a limited range of angles (90-θ) with respect to the incident light, the polymer reflective polarizers 215 perform over a broader range of angles. FIG. 4 illustrates a measurement of the S and P transmission (610, 620 respectively), and P and S reflectivity (630, 640 respectively), verses angle θ for a typical reflective polarizing film operating over a broad range of angles, much broader than any thin film polarizing beam splitter coating enabling the Polarization Conversion System 220 to operate over much higher numerical apertures. FIG. 5 shows the transmission of unpolarized light through a sample film as a function of wavelength. The substantially uniform transmission of light through these multi-layer reflective polymer films across the whole spectrum makes them very useful for a polarization conversion system.

Figure 3A:
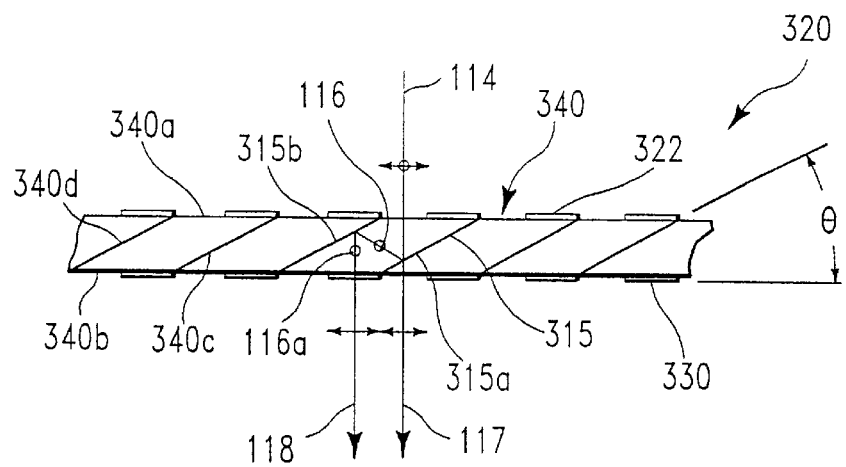
FIG. 3A illustrates a sectional view of an alternative embodiment of the Polarization Conversion System of FIG. 2B.

Another embodiment of the polarization conversion system is shown in FIG. 3A and referred to generally as reference numeral 320. In this embodiment the reflective polarizing material 315 is inclined at an angle θ, where θ is preferably 30 degrees, allowing the use of the same film surface for transmitting the P-polarization 117 and for reflecting the S-polarization 116. In this configuration, the P-polarized light 117 passes through the lower half 315a of the reflective polarizer 315 and the reflected S-polarized light 116 proceeds to the upper half 315b of the adjacent reflective polarizing segment reflecting again at this surface to be transmitted through the half wave plate 330 for polarization conversion 118. With this configuration, dual use is made of each reflective polarizing segment 315 and the number of tilted surfaces is cut nearly in half further reducing the cost of the assembly. However, the metal light block 322 and the half wave plate 330 must be aligned to each other.

The components shown in FIG. 3A can be suspended with the help of holders as discussed with regard to the previous embodiment or they can be affixed to a transmissive wedge 340, the wedge is preferably fabricated of a high quality optical glass. The transmissive wedge 340 further has an input side 340a, an output side 340b corresponding to the input and output sides of the polarization conversion system, a polarization side 340c, and a reflecting side 340d. The polymer based reflective polarizing material 315a is affixed to the polarization side 340c, the S-reflector mirror 315b is affixed to the reflecting side 340d, the light block 322 is affixed to the input side 340a, and the half wave plate 330 is affixed to the output side 340b. A plurality of wedges are preferably joined to form the polarization conversion system 320 as shown in FIG. 3A which operates as a single unit.

Figure 3B:
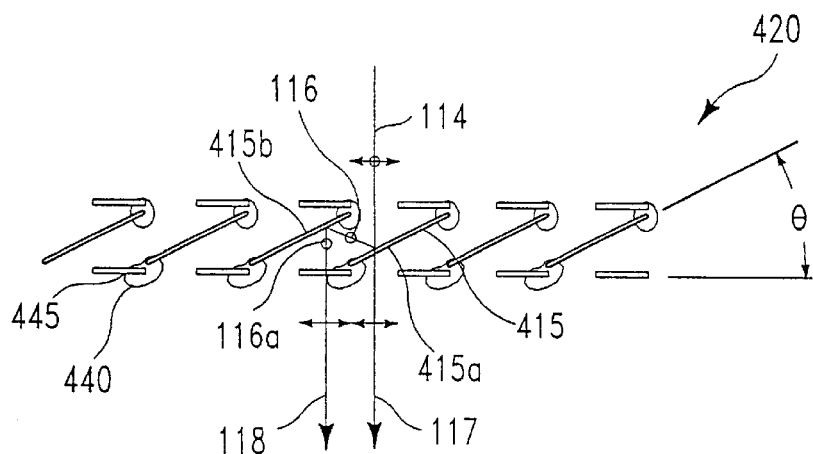
FIG. 3B illustrates a sectional view of yet another alternative embodiment of the Polarization Conversion System of FIG. 2B.

Still another embodiment of the present invention is shown in FIG. 3B, and referred to generally as reference numeral 420. The embodiment of FIG. 3B is similar to that of the previous embodiment except that the reflective polarizing material 415 is now suspended in air with the help of holders 440 having slots 445 for acceptance of the components of FIG. 3B. Alternatively, the reflective polarizing material 415 could be affixed to a thin glass plate (not shown) or sandwiched between thin glass plates (not shown), or affixed to glass wedges. In these cases, the lower part 415a of the surface at 30 degrees has the reflective polarizing material while the upper part 415b may be a simple thin film mirror coating.

Figure 3C:
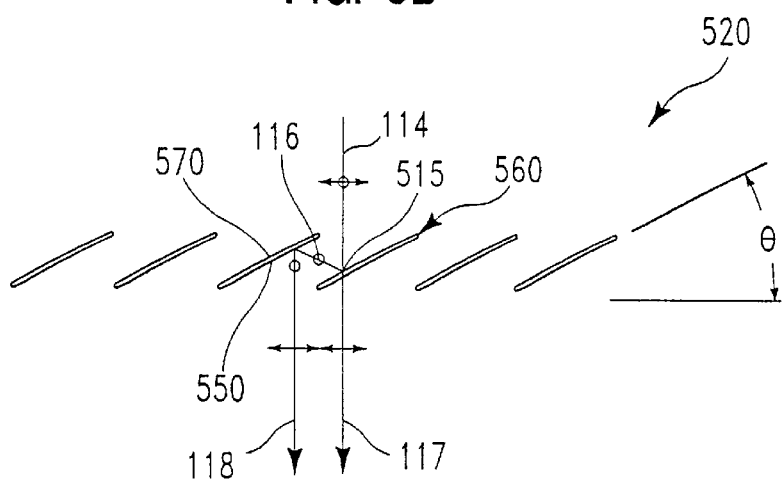
FIG. 3C illustrates a sectional view of still yet another alternative embodiment of the Polarization Conversion System of FIG. 2B.

FIG. 3C shows another embodiment of the polarizing conversion system, referred to generally as reference numeral 520, utilizing a reflective polarizing polymer film 515 where the polarization conversion is accomplished with a quarter wave plate 550 in place of the half wave plate in the previous embodiments. Here the reflective polarizing film 515 is applied to the lower half of a thin glass plate 560 and inclined at an angle θ, preferably 30 degrees. The upper half of the glass plate 560 is coated with a mirror coating 570 on the side furthest from the S-polarized light 116 and a quarter wave plate coating 550 closest to the S-polarized light 116. This serves as the polarization converter, the metal block and the reflector. The S-polarized light 116 is converted to P-polarized light 118 by passing through the two quarter wave plates 550 twice before being transmitted into a direction parallel to the transmitted P-polarized light 117. The thin plates 560 as described are easily manufactured and placed simply into a metal or plastic holder having slots to assemble a very low cost Polarization Conversion System 520 for use in projection displays.

Figure 6:
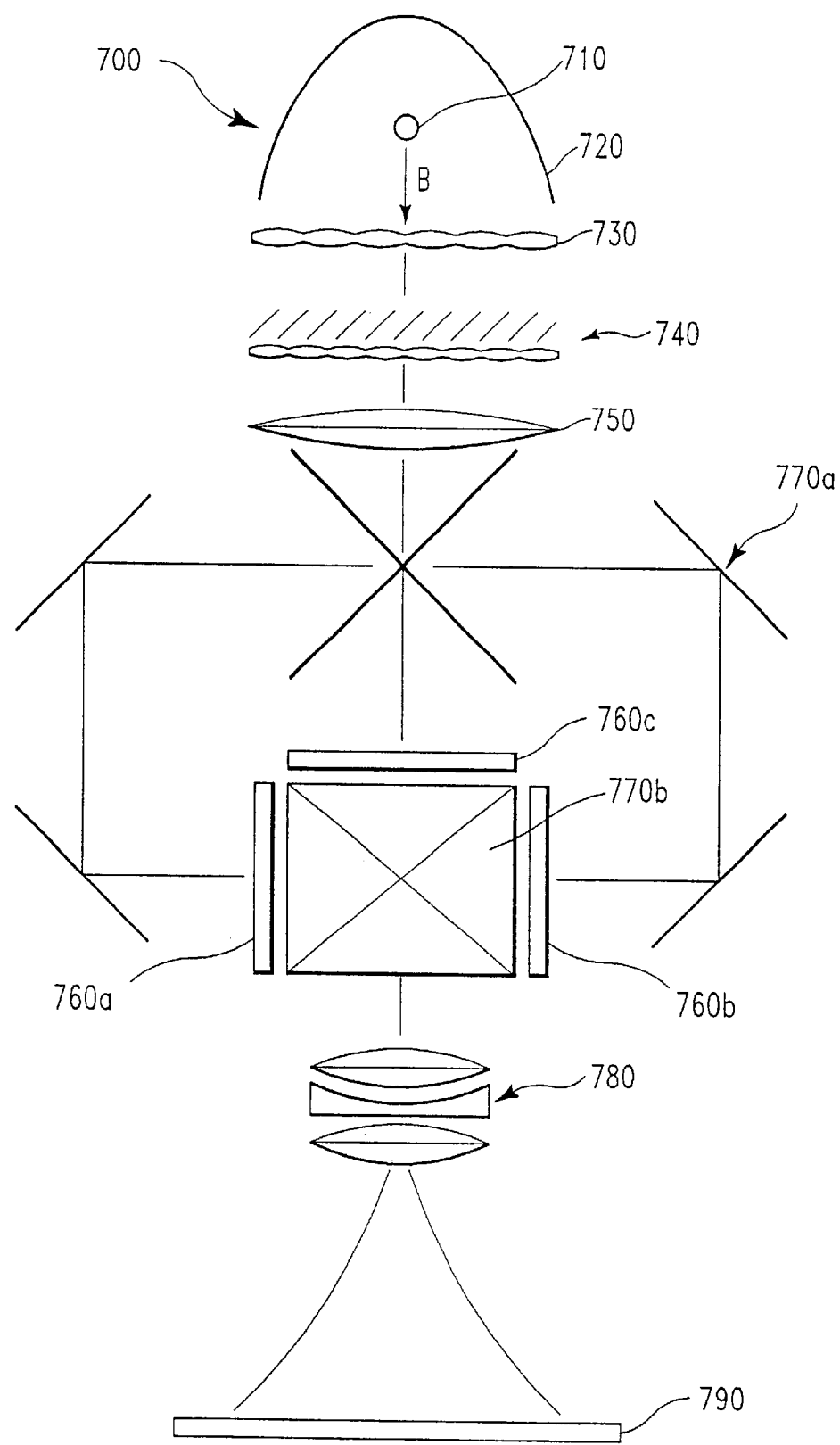
FIG. 6 illustrates a polarization and modulating liquid crystal display system utilizing the Polarization Conversion System of the present invention.

Referring now to FIG. 6, there is illustrated a polarization modulating liquid crystal projection display system, referred to generally as reference numeral 700 in which a polarization conversion system of the present invention is utilized. The polarization modulating liquid crystal projection display system 700 comprises a light source 710, and a reflector 720 for reflecting and directing unpolarized light in the direction of arrow B.

A first array of lenses 730 is provided to sample, subdivide and focus the unpolarized light. The light from the first array of lenses 730 is focused near a polarization conversion system 740 of the present invention. Polarized light from the polarization conversion system 740 is then directed to at least one liquid crystal light valve by a second array of lenses 750. Preferably three liquid crystal light valves are used, red, green, and blue, 760a, 760b, 760c respectively for a color display. Preferably the liquid crystal light valves 760a,760b, and 760c are transmissive as shown in FIG. 6, however, it can be appreciated by someone skilled in the art that reflective light valves can also be used with the inventive polarization conversion system and not depart from the scope and spirit of the present invention.

If more than one color liquid crystal light valve is used, then a color separating and combining means 770a, 770b, respectively, must be used to separate and combine the colors of the individual light valves to form a color image. The image from the separating and combining means 770 is then directed towards a projection lens 780 which projects the image onto a screen 790. The polarization modulating liquid crystal projection display system 700 can be used for a projection computer display, a projection monitor, and a projection video or television system.

From the above description it is understood by someone in the art that the Polarization Conversion System of the present invention can be produced at a very low cost. The proposed layouts are simpler and contain fewer elements than the earlier systems and may be extended to higher numerical apertures due to the properties of the polymer based reflective polarizing material coatings as compared with the previous systems that utilize multi-layer thin dielectric films.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new and desire to secure by Letters Patent is:

1. A polarization conversion system for converting incident light having at least a first and second polarization, to light of one of the first and second polarizations, the polarization conversion system comprising:

an input side at which the incident light enters; an output side at which light of one of the first and second polarizations exits;

a polymer based reflective polarizing material disposed between the input and the output sides, in communication with the incident light for transmitting light on one of the first and second polarizations and reflecting the other;

a reflector for reflecting the reflected light from the polymer based reflective polarizing material; a light block disposed on the input side for blocking the incident light from communication with the reflective means;

a polarization convertor for shifting the polarization of the reflected light to that of the transmitted light;

a holder structure incorporating retaining means for acceptance of the polymer based reflective polarizing material, the reflector, the polarization convertor, and the light block and for containing them in the desired arrangement;

whereby the polymer based reflective polarizing material, the reflector, the polarization convertor, and the light block are arranged such that the transmitted light of one of the first and second polarizations exits the output side, and where the reflected light is directed towards the reflector which directs it towards the polarization convertor which shifts the polarization of the reflected light to that of the transmitted light before exiting the output side; and a transmissive wedge having an input and output side corresponding to the input and output sides of the polarization conversion system, and further having a polarization side and a reflecting side, and wherein the polymer based reflective polarizing material is affixed to the polarization side, the reflector is affixed to the reflecting side, the light block is affixed to the input side, and the polarization converter is affixed to the output side.

2. The polarization conversion system of claim 1, wherein the reflector is a non-polarizing reflector.

3. The polarization conversion system of claim 1, wherein the reflector is a reflective mirror.

4. The polarization conversion system of claim 1, wherein the reflector is also a polymer based reflective polarizing material.

5. The polarization conversion system of claim 1, wherein the transmitted light is P-polarized, the reflected light is S-polarized, the P and S polarizations being shifted 90° from each other, and wherein the polarization convertor is a half wave plate for shifting the S-polarized light to the P-polarized light.

6. The polarization conversion system of claim 1, wherein the polymer based reflective polarizing material is angled 45° with respect to the direction of the incident light.

7. The polarization conversion system of claim 1, wherein the polymer based reflective polarizing material also comprises the reflector and is angled at 60° which respect to the direction of the incident light, the polymer based reflective polarizing materials having a lower half and an upper half and are arranged such that the transmitted light passes through the lower half and the reflected light is directed towards the upper half, reflecting again toward the polarization convertor.

8. The polarization conversion system of claim 1, wherein the polymer based reflective polarizing material, the reflector, the polarization convertor, and the light block are configured as slats, and wherein the slats are arranged in an array of polarization conversion systems operating as a single unit.

9. A polarization conversion system for converting incident light having at least a first and second polarization, to light of one of the first and second polarizations, the polarization conversion system comprising:

an input side at which the incident light enters;

an output side at which light of one of the first and second polarizations exits;

a polymer based reflective polarizing material disposed between the input and the output sides, in communication with the incident light, and angled with respect to the incident light for transmitting light of one of the first and second polarizations and reflecting the other;

a reflector for reflecting the reflected light from the polymer based reflective polarizing material;

a polarization convertor for shifting the polarization of the reflected light to that of the transmitted light;

a holder structure incorporating retaining means for acceptance of the polymer based reflective polarizing material, the reflector and the polarization convertor for containing them in the desired arrangement;

whereby the polymer based reflective polarizing material, the reflector, and the polarization convertor are arranged such that the transmitted light of one of the first and second polarizations exits the output side, and where the reflected light is directed towards the polarization convertor and reflector which shifts the polarization of the reflected light to that of the transmitted light before exiting the output side; and a transmissive wedge having an input and output side corresponding to the input and output sides of the polarization conversion system, and further having a polarization side and a reflecting side, and wherein the polymer based reflective polarizing material is affixed to the polarization side, the reflector is affixed to the reflecting side, the light block is affixed to the input side, and the polarization converter is affixed to the output side.

10. The polarization conversion system of claim 9, wherein the reflector is a non-polarizing reflector.

11. The polarization conversion system of claim 9, wherein the reflector is a reflective mirror.

12. The polarization conversion system of claim 9, wherein the reflector is also a polymer based reflective polarizing material.

13. The polarization conversion system of claim 9, wherein the polymer based reflective polarizing material also comprises the reflector and is angled at 60° which respect to the direction of the incident light, the polymer based reflective polarizing materials having a lower half and an upper half and are arranged such that the transmitted light passes through the lower half and the reflected light is directed towards the upper half, reflecting again toward the polarization convertor.

14. The polarization conversion system of claim 9, wherein the transmitted light is P-polarized, the reflected light is S-polarized, the P and S polarizations being shifted 90° from each other, and wherein the polarization convertor comprises a quarter wave plate which shifts the polarization of light 45° and which is disposed such that the reflected light is first directed through the quarter wave plate then to the reflector which again directs the reflected light through the quarter wave plate resulting in the reflected light being shifted 90° from S-polarization to P-polarization.

15. The polarization conversion system of claim 9, wherein the polymer based reflective polarizing material, the reflector, the polarization convertor, and the light block are configured as slats, and wherein the slats are arranged in an array of polarization conversion systems operating as a single unit.

16. A polarization modulating liquid crystal projection display system comprising:
a light source for providing unpolarized light;
a reflector for directing the unpolarized light;
a first array of lenses upon which the unpolarized light is directed for subdividing and focusing the unpolarized light into an array of incident light beams having at least a first and second polarization;
a polarization conversion system upon which the array of incident light is directed and disposed near the focus of the first array of lenses, for converting the incident light having at least a first and second polarization, to light of one of the first and second polarizations, the polarization conversion system comprising; an input side at which the incident light enters; an output side at which light of one of the first and second polarizations exits; an array of polymer based reflective polarizing materials disposed between the input and the output sides, each individual polymer based reflective polarizing material being in communication with each incident light beam, and angled with respect to the incident light for transmitting light of one of the first and second polarizations and reflecting the other; an array of reflectors for reflecting the reflected light from each polymer based reflective polarizing material; an array of light blocks disposed on the input side for blocking the incident light beams from communication with the reflectors; and an array of polarization convertors for shifting the polarization of the reflected light to that of the transmitted light; a holder structure incorporating retaining means for acceptance of the polymer based reflective polarizing materials, the reflectors, the polarization convertors, and the light blocks arranged relative to each other such that the transmitted light of one of the first and second polarizations exits the output side, and where the reflected light is directed towards the reflectors which directs it towards the polarization convertors which shifts the polarization of the reflected light to that of the transmitted light before exiting the output side;
a transmissive wedge having an input and output side corresponding to the input and output sides of the polarization conversion system, and further having a polarization side and a reflecting side, and wherein the polymer based reflective polarizing material is affixed to the polarization side, the reflector is affixed to the reflecting side, the light block is affixed to the input side, and the polarization converter is affixed to the output side;
a second array of lenses for directing the polarized light;
at least one liquid crystal light valve upon which the polarized light is directed for generation of an image;
a projection lens for projecting the image; and
a screen upon which the image is projected.

17. The polarization modulating liquid crystal projection display system of claim 16, further comprising a magnifying and relay lens system for illuminating the light valve.

18. The polarization modulating liquid crystal projection display system of claim 16, wherein the liquid crystal light valve(s) are of the transmissive type.

19. The polarization modulating liquid crystal projection display system of claim 16, wherein the liquid crystal light valve(s) are of the reflective type.

20. The polarization modulating liquid crystal projection display system of claim 16, wherein there is more than one liquid crystal light valve, each being capable of displaying a different color image, and further comprising a color separating and combining means for separating and combining the color images of the individual liquid crystal light valves to form a color image.

21. The polarization modulating liquid crystal projection display system of claim 20, wherein a first liquid crystal light valve i red, a second liquid crystal light valve is green, and a third liquid crystal light valve is blue.

22. A polarization modulating liquid crystal projection display system comprising:
a light source for providing unpolarized light;
a reflector for directing the unpolarized light;
a first array of lenses upon which the unpolarized light is directed for subdividing and focusing the unpolarized light into an array of incident light beams having at least a first and second polarization;
a polarization conversion system upon which the array of incident light is directed and disposed near the focus of the first array of lenses, for converting the incident light having at least a first and second polarization, to light of one of the first and second polarizations, the polarization conversion system comprising; an input side at which the incident light enters; an output side at which light of one of the first and second polarizations exits; an array of polymer based reflective polarizing materials disposed between the input and the output sides, each individual polymer based reflective polarizing material being in communication with each incident light beam, and angled with respect to the incident light for transmitting light of one of the first and second polarizations and reflecting the other; an array of reflectors for reflecting the reflected light from each polymer based reflective polarizing material; and an array of polarization convertors for shifting the polarization of the reflected light to that of the transmitted light; a holder structure incorporating retaining means for acceptance of the polymer based reflective polarizing materials, the reflectors, and the polarization convertors arranged relative to each other such that the transmitted light of one of the first and second polarizations exits the output side, and where the reflected light is directed towards the polarization convertors and reflectors which shifts the polarization of the reflected light to that of the transmitted light before exiting the output side;

a transmissive wedge having an input and output side corresponding to the input and output sides of the polarization conversion system, and further having a polarization side and a reflecting side, and wherein the polymer based reflective polarizing material is affixed to the polarization side, the reflector is affixed to the reflecting side, the light block is affixed to the input side, and the polarization converter is affixed to the output side;

a second array of lenses for directing the polarized light;

at least one liquid crystal light valve upon which the polarized light is directed for generation of an image;

a projection lens for projecting the image; and a screen upon which the image is projected.

23. The polarization modulating liquid crystal projection display system of claim 22, further comprising a magnifying and relay lens system for illuminating the light valve.

24. The polarization modulating liquid crystal projection display system of claim 22, wherein the liquid crystal light valve(s) are of the transmissive type.

25. The polarization modulating liquid crystal projection display system of claim 22, wherein the liquid crystal light valve(s) are of the reflective type.

26. The polarization modulating liquid crystal projection display system of claim 22, wherein there is more than one liquid crystal light valve, each being capable of displaying a different color image, and further comprising a color separating and combining means for separating and combining the color images of the individual liquid crystal light valves to form a color image.

27. The polarization modulating liquid crystal projection display system of claim 26, wherein a first liquid crystal light valve is red, a second liquid crystal light valve is green, and a third liquid crystal light valve is blue.

* * * * *